(12) United States Patent
Yun et al.

(10) Patent No.: US 12,505,896 B2
(45) Date of Patent: Dec. 23, 2025

(54) MEMORY BUILT-IN SELF-TEST WITH ADDRESS SKIPPING TRIM SEARCH

(71) Applicant: Siemens Industry Software Inc., Plano, TX (US)

(72) Inventors: Jongsin Yun, Portland, OR (US); Martin Keim, Green Cove Springs, FL (US); Christopher Münch, Karlsruhe (DE); Mehdi Baradaran Tahoori, Karlsruhe (DE)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 18/729,195

(22) PCT Filed: Jan. 27, 2022

(86) PCT No.: PCT/US2022/013975
§ 371 (c)(1),
(2) Date: Jul. 16, 2024

(87) PCT Pub. No.: WO2023/146520
PCT Pub. Date: Aug. 3, 2023

(65) Prior Publication Data
US 2025/0111883 A1    Apr. 3, 2025

(51) Int. Cl.
*G11C 29/12*    (2006.01)
(52) U.S. Cl.
CPC .................................. *G11C 29/12* (2013.01)
(58) Field of Classification Search
None
See application file for complete search history.

(56) References Cited

U.S. PATENT DOCUMENTS

| | | | |
|---|---|---|---|
| 7,672,803 B1* | 3/2010 | Lee | G11C 29/44 |
| | | | 702/117 |
| 11,495,316 B1* | 11/2022 | Xie | G11C 29/028 |
| 11,922,049 B2* | 3/2024 | Benson | G11C 7/04 |
| 2007/0047315 A1* | 3/2007 | Aritome | G11C 16/102 |
| | | | 365/185.18 |

(Continued)

FOREIGN PATENT DOCUMENTS

WO    2021118634 A1    6/2021

OTHER PUBLICATIONS

J. Yun et al., "MBIST Supported Multi Step Trim for Reliable eMRAM Sensing," 2020 IEEE International Test Conference (ITC), Washington, DC, USA, 2020, pp. 1-5, (Year: 2020).*

(Continued)

*Primary Examiner* — Daniel F. McMahon

(57) ABSTRACT

An address-skipping trim search performed by a memory built-in self-test system comprises: perform memory read operations on one memory bank to determine whether it fails to correctly sense values of stored data based on a reference trim value for a previous memory bank; if the present memory bank fails, perform memory read operations to search for a new reference trim value for the present memory bank; or otherwise, treat the present reference trim value as the one for the present memory bank and proceed to testing a next memory bank. The range for searching for the new reference trim value can be limited by the present reference trim value.

18 Claims, 13 Drawing Sheets

(56) References Cited

U.S. PATENT DOCUMENTS

| | | | |
|---|---|---|---|
| 2007/0223278 A1* | 9/2007 | Aritome | G11C 16/3459 |
| | | | 365/185.11 |
| 2010/0289590 A1* | 11/2010 | von Staudt | G01R 31/31915 |
| | | | 331/1 A |
| 2017/0109040 A1 | 4/2017 | Raghu et al. | |
| 2021/0134378 A1 | 5/2021 | Papandreou et al. | |
| 2021/0191638 A1 | 6/2021 | Miladinovic et al. | |
| 2021/0263848 A1* | 8/2021 | Wieduwilt | G11C 11/5628 |

OTHER PUBLICATIONS

Junichi Suzuki, et al. "A Cost-Effective High Accuracy Auto-Trimming System without Tester Constraint for Low-End Embedded Flash Memory": trim circuit used in Flash memory application, 2018 Renesas ISOCC, Tokyo, Japan.

Artur Antonyan, et al. "Embedded MRAM Macro for eFlash Replacement", 2018 IEEE International Symposium on Circuits and Systems (ISCAS), 2018, 4 pgs, Korea.

Yi-Chun Shih, et al. "Logic Process Compatible 40-nm 16-Mb, Embedded Perpendicular-MRAM With Hybrid-Resistance Reference, Sub-µA Sensing Resolution, and 17.5-nS Read Access Time", IEEE Journal of Solid-State Circuits, vol. 54, No. 4, Apr. 2019, pp. 1029-1038.

Jongsin Yun, et al. "MBIST Support for Reliable eMRAM Sensing", 2020 25th IEEE European Test Symposium (ETS).

Jongsin Yun, et al. "MBIST Supported Multi Step Trim for Reliable eMRAM Sensing", 2020 ITC.

\* cited by examiner

MEMORY BUILT-IN SELF-TEST WITH ADDRESS SKIPPING TRIM SEARCH

FIELD OF THE DISCLOSED TECHNIQUES

The presently disclosed techniques relates to memory testing. Various implementations of the disclosed techniques may be particularly useful for testing magnetoresistive random access memory devices.

BACKGROUND OF THE DISCLOSED TECHNIQUES

Magnetoresistive random access memory (MRAM) has become an attractive non-volatile memory solution due to its small size, fast operation speed, and good endurance. MRAM devices can store data in magnetic domains, for example, as a spin polarity of magnets in their free layers. A spin torque transfer (STT)-based MRAM device can write data in a magnetic domain by setting the spin polarity of magnets in its free layer, which provides a spin-polarized current through magnetic tunnel junction (MTJ) and exerts torque on local magnetization in the free layer. The electron spin polarity of these layers switches based on the write-current direction. As a result, cells in the MRAM device can be switched to either a high resistance state (anti-parallel, RAP) or a low resistance state (parallel, RP).

To read the stored data, the MRAM device can ascertain the spin polarity of the magnets in its free layer relative to a pinned reference layer underneath the corresponding free layer. When the spin polarity is parallel to the pinned reference layer, the resistance on a reference bit line (bit column) of the MRAM device can be deemed low and thus corresponds to a data bit of "0". When the spin polarity is perpendicular or anti-parallel to the pinned reference layer, the resistance on the reference bit line of the MRAM device can be deemed high and thus corresponds to a data bit of "1". The MRAM device can include sensing circuitry to detect the resistance on the reference bit-line of the MRAM device and compare the detected resistance against a reference resistance to determine whether the detected resistance corresponds to a data bit "0" or to a data bit "1".

Many MRAM devices have a relatively small resistance separation between a high resistive state associated with a data "1" value and a low resistive state associated with a data "0" value. Due to the small resistance separation, setting the reference resistance is very challenging. Some MRAM devices have included trim circuitry to adjust the reference resistance used by the MRAM devices to differentiate between high resistive states and low resistive states of its memory cells. The trim circuitry can receive an external input corresponding to a reference trim, for example, from test engineers, which can adjust the reference resistance that the MRAM devices compares against the resistance values read from its memory cells to determine whether the memory cells stored data "1" values or data "0" values. Test engineers typically determine values for reference trims in MRAM devices through extensive testing over different environmental conditions, such as temperature variations, to identify a full distribution of bit properties for the MRAM device before performing engineering analysis to identify the reference trims. This MRAM device testing has proven costly or impractical in larger MRAM implementations.

A memory built-in self-test system may be employed to perform reference trim searching and setting. This process is performed automatically on a chip, requiring minimum external intervention. The reference trim can not only be set right after manufacturing but also be adjusted while being installed in system. A major challenge for this approach, however, is the long search time which can render it impractical.

BRIEF SUMMARY OF THE DISCLOSED TECHNIQUES

Various aspects of the disclosed technology relate to automated reference trim search with address skipping for memory devices. In one aspect, there is a circuit, comprising: a memory device configured to sense values of stored data using a reference value associated with a reference trim during memory read operations, the memory device comprising a plurality of memory banks; and a memory built-in self-test system configured to perform memory processes on the memory device, one of the memory processes being an automated reference trim search process comprising: determining boundary values of the reference trim for data types of "0" and "1" separately based on a predetermined failure condition, and setting the reference trim using the boundary values of the reference trim for data types of "0" and "1", wherein determining each of the boundary values of the reference trim for data types of "0" and "1" comprises: performing a first plurality of the memory read operations on one of the memory banks to determine whether the one of the memory banks fails to correctly sense values of stored data using a reference value associated with a first intermediate boundary value of the reference trim based on the predetermined failure condition, setting, if the one of the memory banks does not fail, a second intermediate boundary value of the reference trim equal to the first intermediate boundary value of the reference trim, performing, if the one of the memory banks fails, a second plurality of the memory read operations on the one of the memory banks to determine the second intermediate boundary value of the reference trim based on a search sequence, the first intermediate boundary value of the reference trim, and the predetermined failure condition, and repeating the above operations by setting the first intermediate boundary value of the reference trim equal to the second intermediate boundary value of the reference trim for another one of the memory banks.

The memory built-in self-test system may comprise: a memory built-in self-test controller configured to prompt the memory device to perform the memory read operations and memory write operations during the automated reference trim search process, and a built-in self-test interface comprising: a failure detection circuit configured to determine whether the memory device fails to correctly sense a value stored in the memory device, and a trim feedback circuit configured to adjust intermediate boundary values of the reference trim based on the determined failure result during the automated reference trim search process.

The determining each of the boundary values of the reference trim for "0" and "1" may further comprises: performing a third plurality of the memory read operations on a memory bank in the memory banks to determine an initial value of the first intermediate boundary value of the reference trim based on a binary search sequence.

The search sequence may be a binary search sequence, each step of the binary search sequence determining one bit of the second intermediate boundary value of the reference trim. The binary search sequence may skip testing some bits of the second intermediate boundary value of the reference trim based on the first intermediate boundary value of the reference trim.

The determining the second intermediate boundary reference trim may be performed in a range between the first intermediate boundary value of the reference trim and one of a lowest value or a highest value allowed for the reference trim based on data types of stored data.

The predetermined failure condition may be a threshold count of read failures. The memory may be a magnetoresistive random-access memory (MRAM) or a resistive random access memory (ReRAM).

The sensing values of stored data using a reference value associated with a reference trim may comprise: comparing electrical values (resistance values, current values, or voltage values) associated with the memory cells being sensed to a reference value associated with the reference trim.

In another aspect, there are one or more computer-readable media storing computer-executable instructions for causing a computer to perform a method, the method comprising: creating the above memory built-in self-test system in a circuit design.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed techniques. Thus, for example, those skilled in the art will recognize that the disclosed techniques may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNIQUES

Various aspects of the disclosed technology relate to automated reference trim search with address skipping for memory devices. In the following description, numerous details are set forth for the purpose of explanation. However, one of ordinary skill in the art will realize that the disclosed technology may be practiced without the use of these specific details. In other instances, well-known features have not been described in details to avoid obscuring the disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods.

The detailed description of a method or a device sometimes uses terms like "determine," "set," and "perform" to describe the disclosed method or the device function/structure. Such terms are high-level descriptions. The actual operations or functions/structures that correspond to these terms will vary depending on the particular implementation and are readily discernible by one of ordinary skill in the art.

As used in this disclosure, the singular forms "a," "an," and "the" include the plural forms unless the context clearly dictates otherwise. Additionally, the term "includes" means "comprises." Moreover, unless the context dictates otherwise, the term "coupled" means electrically or electromagnetically connected or linked and includes both direct connections or direct links and indirect connections or indirect links through one or more intermediate elements not affecting the intended operation of the circuit.

Figure 1:
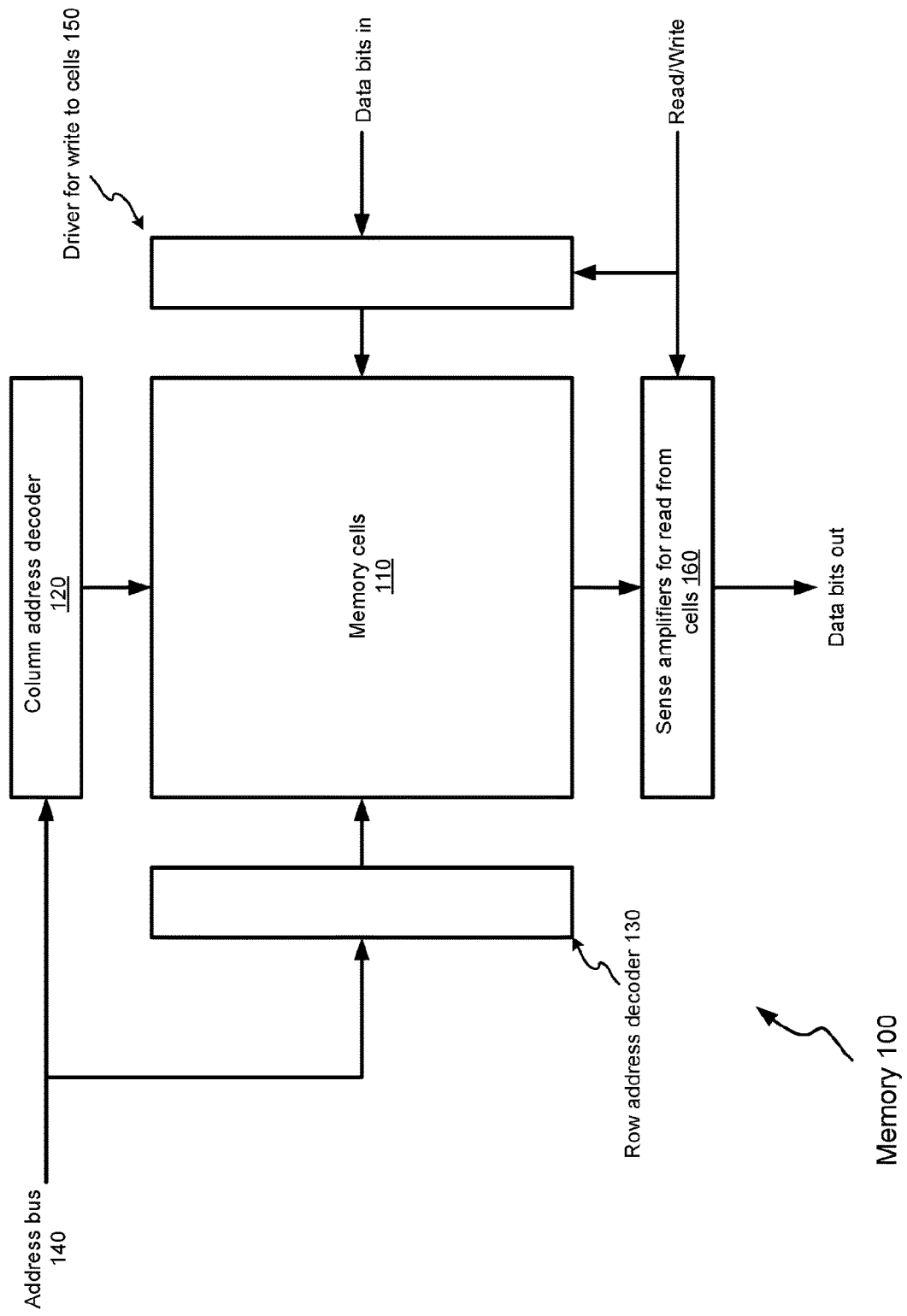
FIG. 1 illustrates an example of a block diagram of a typical memory.

Memories form a large part of system-on-chip circuits. Embedded memories can provide higher bandwidth and consume lower power than stand-alone memories. FIG. 1 illustrates an example of a block diagram of a typical memory 100. The memory 100 comprises memory cells 110, a column address decoder 120, a row address decoder 130, driver circuitry 150, and sense amplifiers 160. The memory cells 110 are connected in a two-dimensional array. Each of the memory cells 110 can store one bit of binary information. The memory cells 110 can be grouped into memory words of fixed word length, for example 1, 2, 4, 8, 16, 32, 64 or 128 bit. A memory cell has two fundamental components: storage node and select device. The storage node stores the data bit for the memory cell, and the select device component facilitates the memory cell to be addressed to read/write in an array.

The row address decoder 130 and the column address decoder 120 determine the cell address that needs to be accessed. Based on the addresses on row address decoder 130 and the column address decoder 120, the corresponding row(s) and column(s) get selected and connected to the sense amplifiers 160 during a read operation. Each of the sense amplifiers 160 amplifies send out a data bit. Similarly, the required cells where the data bits need to be written are selected by the addresses on row address decoder 130 and the column address decoder 120. To write data bits into memory cells, however, the driver 150 is used. The address information is supplied through an address bus 140.

Figure 2:
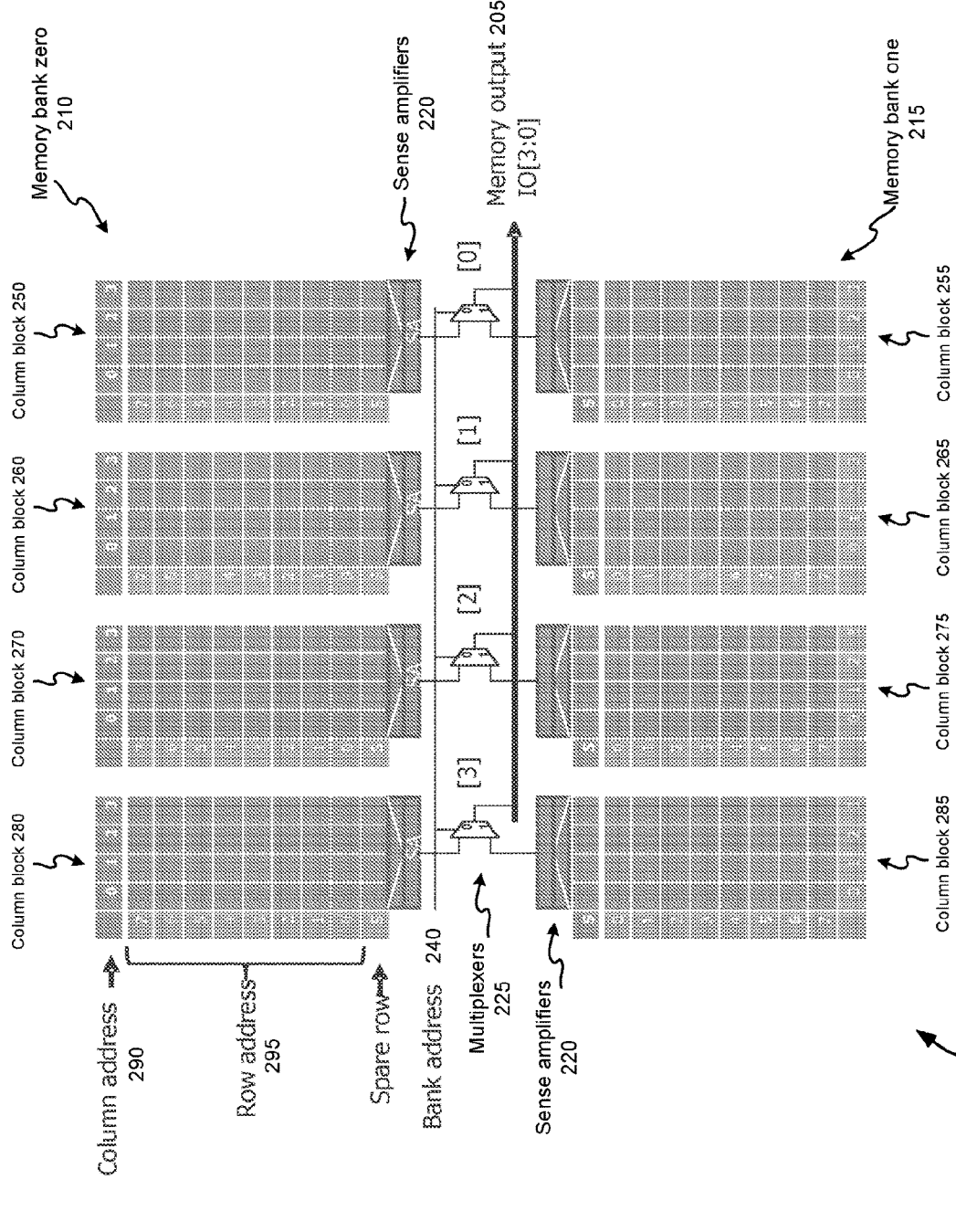
FIG. 2 illustrates an example of a memory device comprising two memory banks.

A memory device can have multiple memory banks. A memory bank can comprise multiple rows and columns of memory cells. Typically in a single read or write operation, only one bank is accessed. FIG. 2 illustrates an example of a memory device 200 comprising two memory banks 210 and 215. Each of the memory banks 210 and 215 comprises four column blocks. Column blocks may also referred to as subbanks. Here, column blocks 250, 260, 270 and 280 belong to the memory bank 210, while column blocks 255, 265, 275 and 285 are components of the memory bank 215. A memory cell in each of the eight column blocks 250-285 is selected by a combination of column address 290 and row address 295. The output for each of the eight column blocks 250-285 is coupled through a multiplexer to one of sense amplifiers 220. Bank address 240 determines, via multiplexers 225, from which memory bank outputs of the sense amplifiers 220 are coupled to memory outputs 205. For example, if the column address 290, the row address 295, and the bank address 240 are 4, 2, and 0, respectively, bits stored at memory cells at row 4 and column 2 of the column blocks 250, 260, 270 and 280 are outputted as bits 0-3 of a word, respectively.

Figure 3:
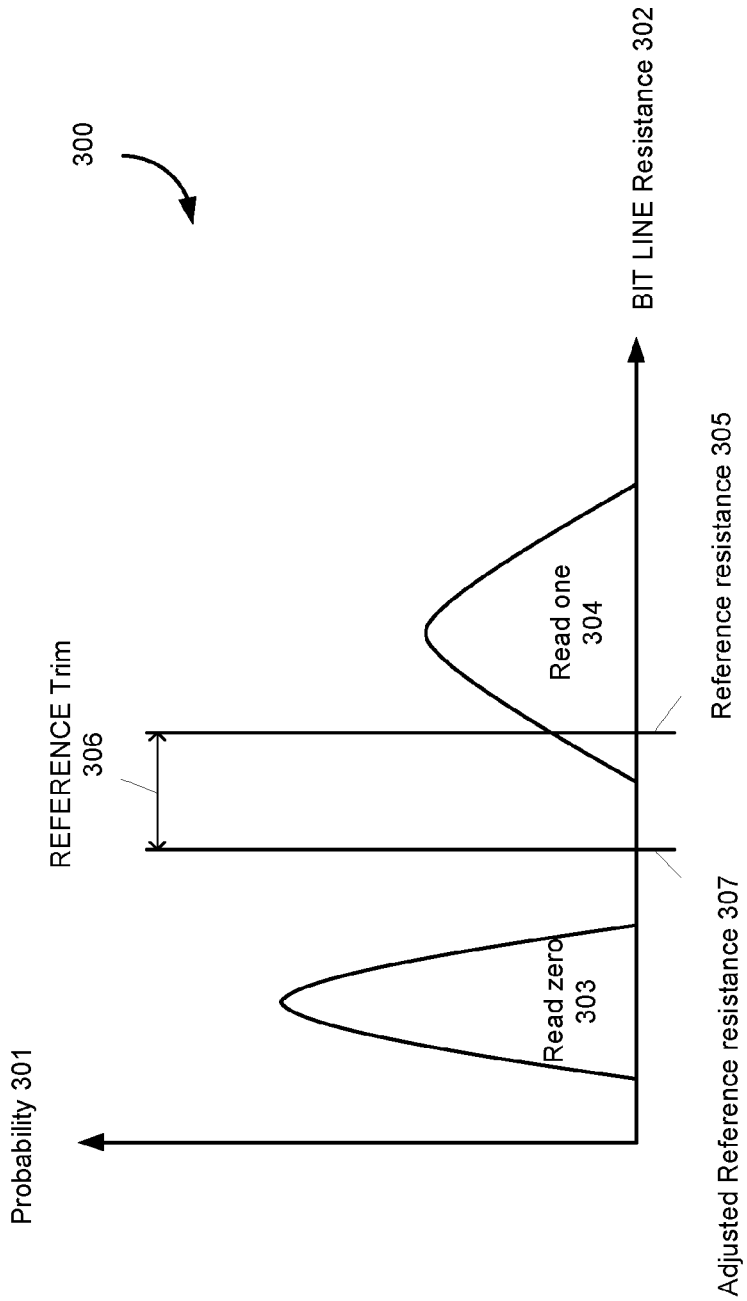
FIG. 3 illustrates an example of a resistance distribution graph of a magnetoresistive memory device.

A sense amplifier can determine whether a data bit stored in the memory is a "0" or "1" by comparing the output from the data bit with a reference value. Due to process variations, the "1" and "0" states of a MRAM has a certain range of resistance distribution similar to a normal distribution. FIG. 3 illustrates an example of a resistance distribution graph 300 of a magnetoresistive memory device. The resistance distribution graph 300 has an x-axis corresponding to bit line resistances 302 of the magnetoresistive memory device and has a y-axis corresponding to a probability 301 or likelihood of occurrence for each of the bit line resistances 302. Each of the bit line resistances 202 can be used as a memory cell to store a bit of zero or a bit of one. As such, the resistance distribution graph 300 shows two normal distribution features: one for bit line resistances associated with reading a stored data "0" value or read zero 303 and another for bit line resistances associated with reading a stored data "1" value or read one 304. It has been reported that the resistance value for the "1" state decreases with an increase of the temperature. In one report, the resistance value for the "0" state stays at ~10 (arbitrary unit) and does not much changed much with the temperature, whereas the resistance value for the "1" state changes from 30 to 22 (arbitrary unit) when the temperature changes from −40 to 85° C.

The magnetoresistive memory device can also include a reference resistance 305 (in terms of a specific voltage value or a specific current value) for determining whether a sensed bit line resistance value corresponds to a stored data "0" value or a stored data "1" value. In the instant example, the reference resistance 305 falls within a range corresponding to bit line resistances associated with a stored data "1" value 304. This can result in a resistance of a stored data "1" value being incorrectly associated with a stored data "0" value by the reference resistance 205 during a read operation. In some instances, the magnetoresistive memory device can adjust the reference resistance 305 using a reference trim 306 to generate an adjusted reference resistance 307 (also in terms of a specific voltage value or a specific current value), which can be located between the read zero 303 and the read one 304 characteristics of the magnetoresistive memory device.

It should be noted that searching for and setting a reference trim can be performed for a circuit block comprising a single column that is attached to a sense amplifier, or for a memory bank or a whole memory to minimize trim data to store.

Figure 4:
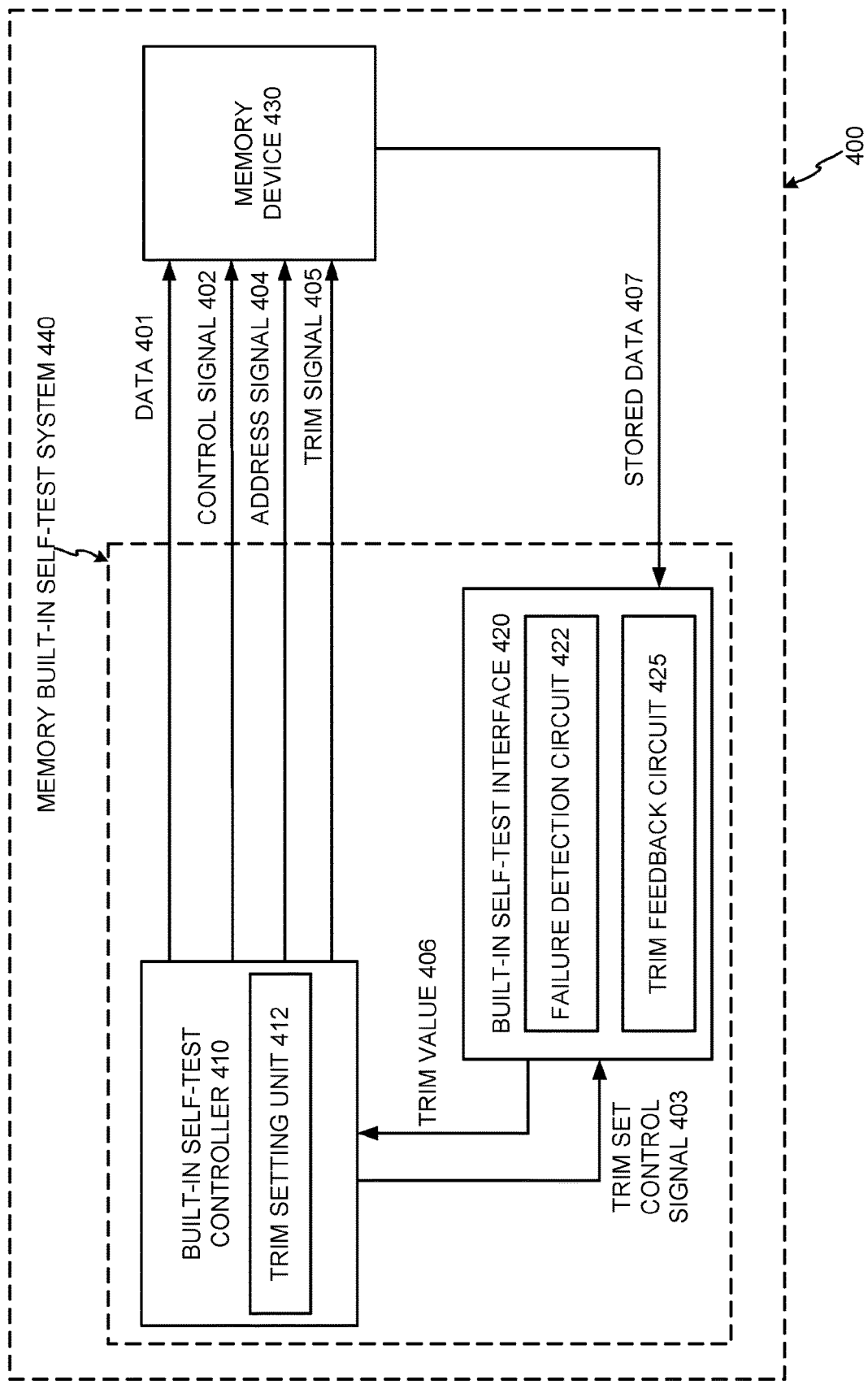
FIG. 4 illustrates an example circuit which can perform an automated reference trim search process with address skipping according to various embodiments of the disclosed technology.

FIG. 4 illustrates an example circuit 400 which can perform an automated reference trim search process with address skipping according to various embodiments of the disclosed technology. The circuit 400 comprises a memory device 430 and a memory built-in self-test system 440. The memory device 430 can be configured to store data 401 during data write operations and to output stored data 407 during data read operations. The memory device 430 can comprise a plurality of memory banks. Each memory bank can comprise multiple rows and columns of memory cells. The memory device 430 in some embodiments can include a magnetoresistive random access memory (MRAM) to store the data 401 in magnetic domains, for example, as a spin polarity of magnets in a free layer. The magnetoresistive random access memory can be a spin torque transfer (STT) MRAM device, which can write the data 401 by providing a spin-polarized current through magnetic tunnel junction (MTJ), which exerts torque on local magnetization in the free layer. In some other embodiments, the memory device 430 can include other types of random access memory (RAM) such as resistive random access memory (ReRAM).

The memory built-in self-test system 440 can be configured to perform memory processes such as memory test, memory repair, and reference trim search on the memory device 430. The memory built-in self-test system 440 can comprise a built-in self-test controller 410 and a built-in self-test interface 420. The built-in self-test controller 410 can be configured to control memory access operations of the memory device 430. The built-in self-test controller 410 can generate a control signal 402 and an address signal 404 that, when provided to the memory device 430, can prompt the memory device 430 to perform a memory access operation, such as a data write operation or a data read operation at an address indicated by the address signal 404. When the control signal 402 corresponds to a data write operation, the memory device 430 can store the data 401 from the built-in self-test controller 410 at the address indicated by the address signal 404 in response to the control signal 402. When the control signal 402 corresponds to a data read operation, the memory device 430 can locate and output the stored data 407 at the address indicated by the address signal 404 in response to the control signal 402. The memory device 430 can read the stored data 407 by sensing an electric value, such as voltage, current, resistance, or the like, associated with a bit line of the memory device 430, and comparing the sensed electrical value against a reference value to determine whether the stored data 407 corresponding to a high data value associated with data "1" or a low data value associated with data "0".

As noted previously, the reference value utilized by the memory device 430 to sense the data value of the stored data 407 can be misaligned with the electrical characteristics of one or more of the memory cells in the memory device 430, the memory device 430 can adjust the reference value with a reference trim, for example, provided to the memory device 430 in a trim signal 405. The memory device 430 can utilize the adjusted reference value to determine whether the stored data 407 corresponds to a high data value or a low data value.

The memory processes performed by the memory built-in self-test system 440 can include an automated reference trim search process. In the automated reference trim search process, the built-in self-test interface 420 can be configured to generate a trim value 406. In some embodiments, the trim value 406 can correspond to a resistance value, a voltage value, a current value, or the like, which can be used to adjust a reference resistance, a reference voltage, a reference current, respectively. The built-in self-test interface 420 can provide the trim value 406 to the built-in self-test controller 410. The built-in self-test controller 410 can generate the trim signal 405 based on the trim value 406. The memory device 430 can utilize the value of the reference trim in the trim signal 405 to adjust the reference value for sensing values of the stored data 407.

The built-in self-test interface 420 can automatically set the trim value 406 (or set the reference trim) that the memory device 430 can utilize to read the stored data 407. In some embodiments, the built-in self-test interface 420 can set the trim value 406 using an automated reference trim search process, for example, by receiving known test data values stored in the memory device 430 that are read with different values for the reference trim and then setting the reference trim based on the results of reading the known test data values.

The built-in self-test controller 410 can include a trim setting unit 412 to initiate the automated reference trim search process, which allows the built-in self-test interface 420 to set the trim value 406. The trim setting unit 412 can write test data, such as the data 401, to the memory device 430, for example, by generating the control signal 402, the address signal 404, and the trim signal 405 to prompt the memory device 430 to perform data write operations with the data 401. In some embodiments, the trim setting unit 412 can write the same data value to memory cells in each of the plurality of memory banks in the memory device 430, such as a data "1" or a data "0".

The trim setting unit 412 can generate a trim set control signal 403 to prompt the built-in self-test interface 420 to select a value for the reference trim as the trim value 406. The trim setting unit 412 can generate the trim signal 405 based on the trim value 406 and provide the trim signal 405 to the memory device 430. The trim setting unit 412 can prompt the memory device 430 to perform data read operations and output the test data, such as the stored data 407, using the value for the reference trim in the trim signal 405.

The built-in self-test interface 420 can include a failure detection circuit 422. The failure detection circuit 422 can be configured to determine whether the memory device 430 fails to output the stored data 407 with the same value as the data 401. In some embodiments, the failure detection circuit 422 can compare the stored data 407 read from the memory device 430 to a type of the test data, such as a data "1" value or a data "0" value written into the memory device 430, and detect failures based on the comparison.

The built-in self-test interface 420 can include a trim feedback circuit 425 to select a different value for the reference trim for a subsequent read of the test data from the memory device 430 based on the failures detected by the failure detection circuit 422. The trim feedback circuit 425 can set the trim value 406 to be the selected value for the reference trim for use in a subsequent read of the test data from the memory device 430. The trim setting unit 412 and the built-in self-test interface 420 can iterate the process of selecting reference trim values and reading the test data from the memory until the trim feedback circuit 425 identifies a reference trim setting (a boundary value of the reference trim) for the type of data. In some embodiments, the trim setting unit 412 can select a new type of the data 401 to store to the memory and initiate the automated reference trim search process to identify a reference trim setting (a boundary value of the reference trim) for the new type of the data. The trim feedback circuit 425 can set the value for the reference trim based on the identified boundary values of the reference trim for the two types of data, for example, by aggregating them.

It should be noted that while the trim setting unit 412 is shown to be in the built-in self-test controller 410 in FIG. 4, the trim setting unit 412 can be placed in the built-in self-test interface 420 instead.

Figure 5:
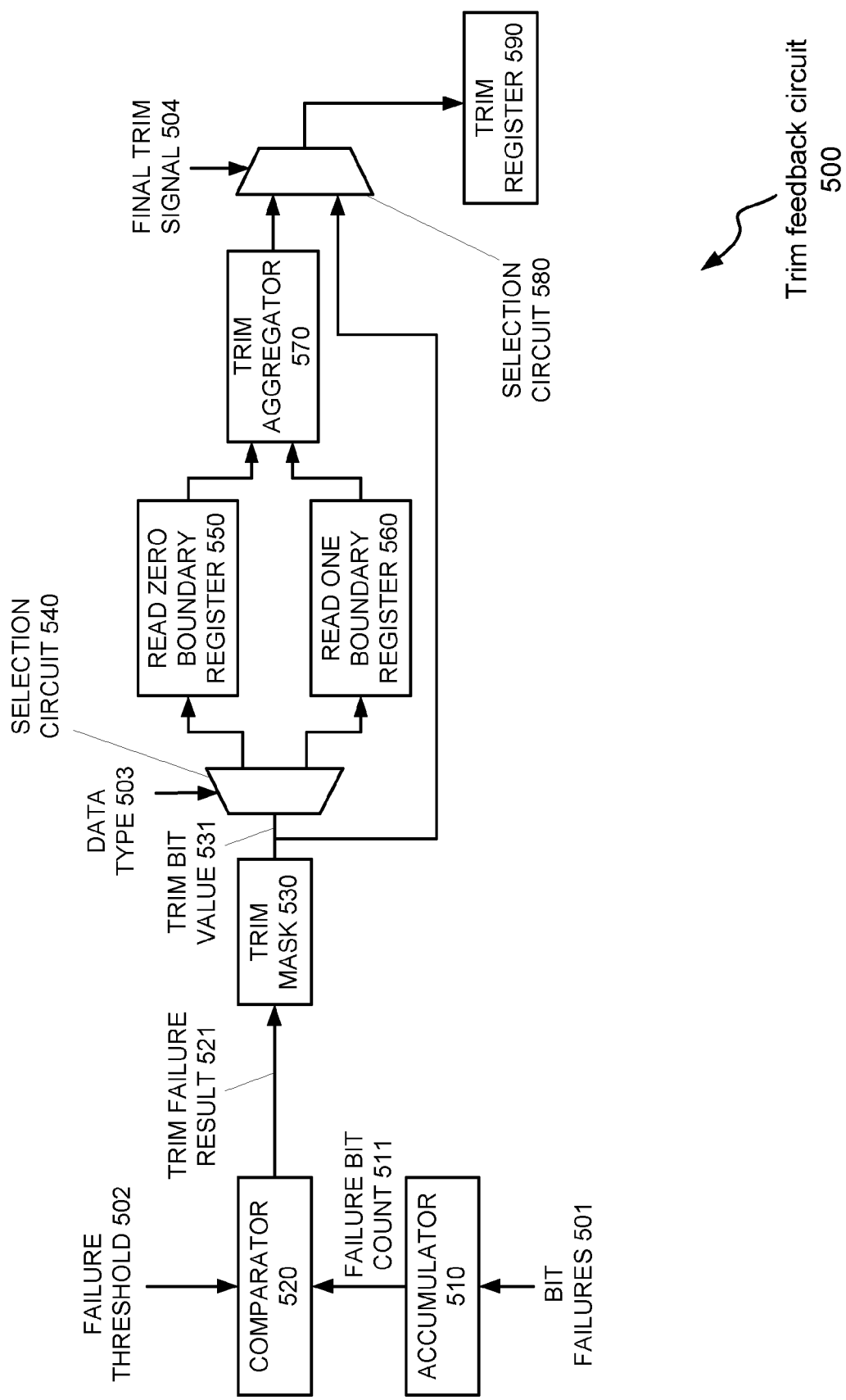
FIG. 5 illustrates an example trim feedback circuit to implement an automated reference trim search process according to various embodiments of the disclosed technology.

FIG. 5 illustrates an example trim feedback circuit 500 to implement an automated reference trim search process according to various embodiments of the disclosed technology. The trim feedback circuit 500 can include an accumulator 510 to receive bit failures 501, for example, from a failure detection circuit 422 shown in FIG. 4. Each of the bit failures 501 can correspond to a bit of data that was misread from a memory device based on a particular reference trim value. For example, when the data having a value of "0" was read from a memory device as having a value of "1", the bit failure 501 for that data can be provided the accumulator 510. The accumulator 510 can add the bit failures 501 associated with data reads based on a particular reference trim to generate the failure bit count 511. An example of failure characteristics of a magnetoresistive memory device for various reference trim values is described below with reference to FIG. 6A.

Figure 6A:
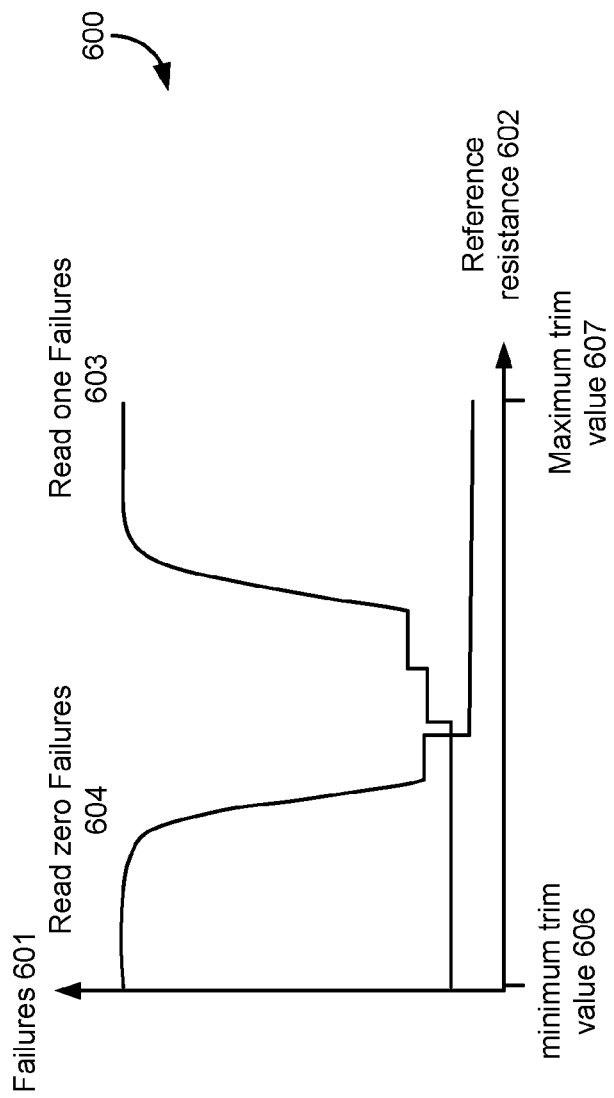
FIG. 6A illustrates a graph of example memory device failures at different sensing reference values according to various embodiments of the disclosed technology.

FIG. 6A illustrates a graph of example memory device failures at different sensing reference values according to various embodiments of the disclosed technology. The graph 600 has an x-axis corresponding to reference resistances 602 used by a magnetoresistive memory device during read operations and has a y-axis corresponding to accumulated failures 601 of read operations using the various reference resistances 602. The reference resistances 602 can range between the minimum trim value 606 and the maximum trim value 607, which correspond to a lowest value of the reference trim and a highest value of the reference trim, respectively.

In the instant example, the magnetoresistive memory device can have an array of memory cells, one or more of which may fail regardless of the value of the reference trim. For instance, when one or more failures in the magnetoresistive memory device corresponds to read zero failures, the accumulated failures 601 may not reached to zero at the maximum trim value 607. The accumulated failures 601 at the maximum trim value 607, in some embodiments, can correspond to a baseline read zero fail count present regardless of the reference trim value. Since the read zero failures at the maximum trim value 607 can correspond to minimum level of read zero failures regardless of the reference trim value, the accumulated failures 601 at the maximum trim value 607 may not be considered when setting the reference trim value based on read zero failures.

When one or more failures in the magnetoresistive memory device corresponds to read one failures, the accumulated failures 601 may not reached to zero at the minimum trim value 606. The accumulated failures 601 at the minimum trim value 606, in some embodiments, can correspond to a baseline read one fail count present regardless of the reference trim value. Since the read one failures at the minimum trim value 606 can correspond to minimum level of read one failures regardless of the reference trim value, the accumulated failures 601 at the minimum trim value 606 may not be considered when setting the reference trim value based on read one failures.

In this example, the graph 600 shows read zero failures 604 and read one failures 603. The read zero failures 604 can correspond to a number of accumulated failures of the memory device to correctly read a data value of "0" using the various reference resistances. The read zero failures 604 show a high number of failures when the reference trim is closer to the minimum trim value 606, and a low number of failures when the reference trim is closer to the maximum trim value 607. The read one failures 603 can correspond to a number of accumulated failures of the memory device to correctly read a data value of "1" using the various reference resistances. The read one failures 603 show a lower number of failures when the reference trim is closer to the minimum trim value 606, and a higher number of failures when the reference trim is closer to the maximum trim value 607.

Referring back to FIG. 5, the trim feedback circuit 500 can include a comparator 520 to determine whether a number of failures for a reference trim value described by the failure bit count 511 exceed a failure threshold 502. The comparator 520 can generate a trim failure result 521 based on the comparison of the failure bit count 511 to the failure threshold 502. In some embodiments, the trim failure result 521 can identify whether the failure bit count 511 exceeds the failure threshold 502.

In some embodiments, the trim feedback circuit 500 can implement an automated reference trim search process using failure tails as the failure threshold 502. An example of automated reference trim search process using failure tails is described below with reference to FIG. 6B. In some embodiments, the trim feedback circuit 500 can implement an automated reference trim search process using failure cliffs as the failure threshold 502. An example of automated reference trim search process using failure cliffs is described below with reference to FIG. 6C.

Figure 6B:
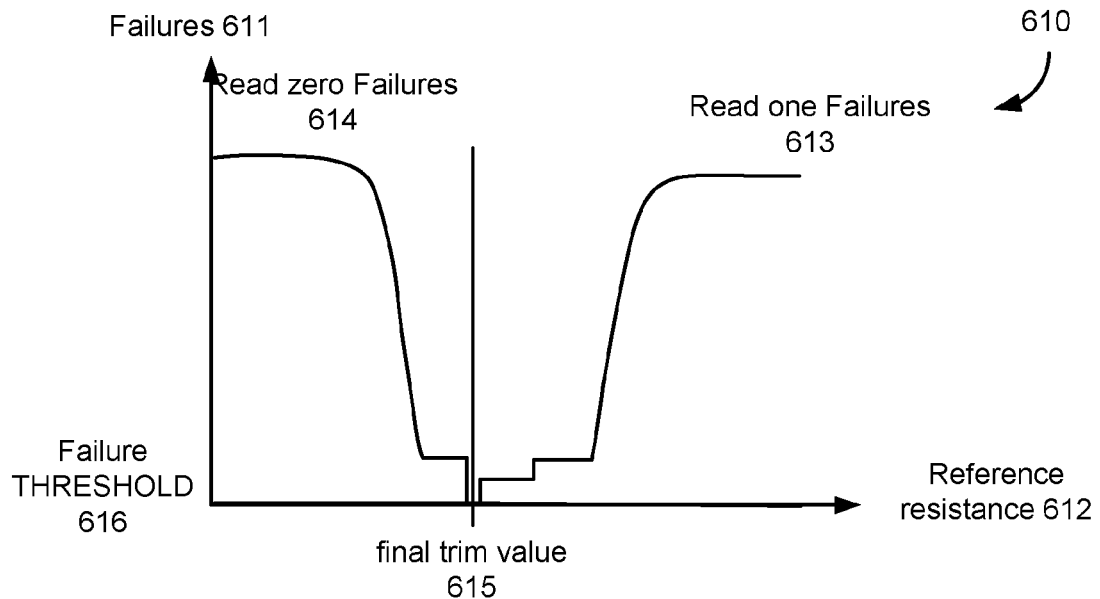
FIGS. 6B and 6C illustrate graphs of example reference trim selection results using different failure thresholds according to various embodiments of the disclosed technology.
Figure 6C:
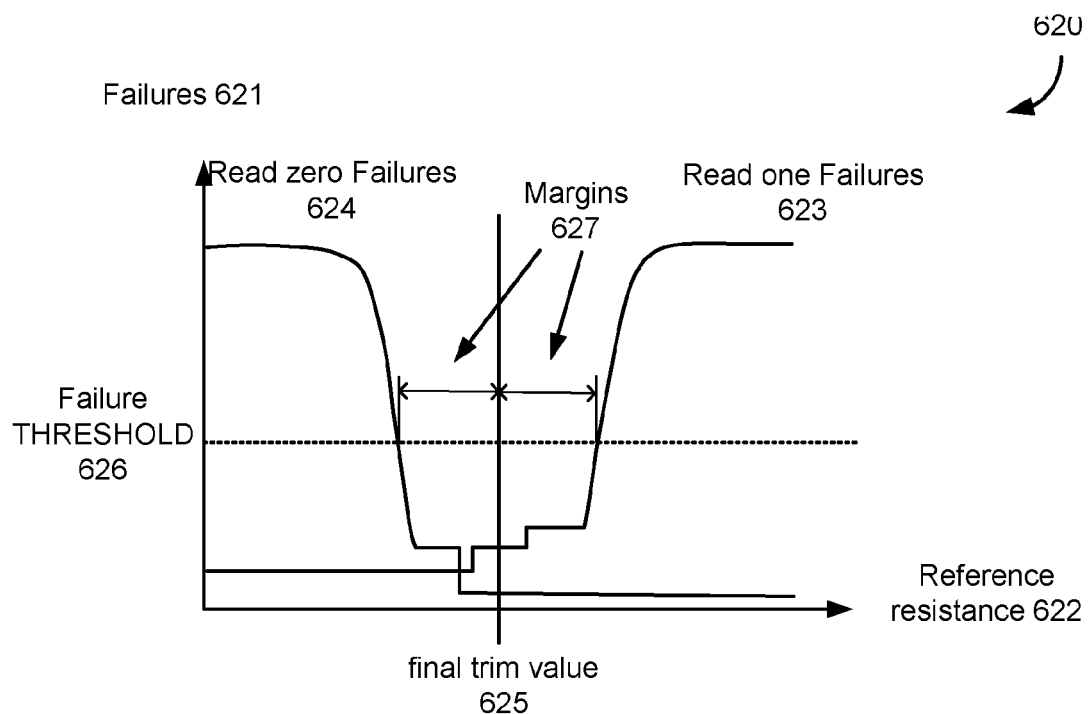

FIGS. 6B and 6C illustrate graphs of example reference trim selection results using different failure thresholds according to various embodiments of the disclosed technology. Referring to FIG. 6B, the graph 610 has an x-axis corresponding to reference resistances 612 used by magnetoresistive memory device during read operations and has a y-axis corresponding to accumulated failures 611 of read operations using the various reference resistances 612. The reference resistances 612 can correspond to an initial reference resistance combined with various reference trim values.

In this example, the graph 610 shows read zero failures 614 and read one failures 613. The read zero failures 614 can correspond to a number of accumulated failures of the memory device to correctly read a data value of "0" using the various reference resistances. The read zero failures 614 show a high number of failures when closer to a smaller reference trim value, and a low number of failures when closer to a large reference trim value. The read one failures 613 can correspond to a number of accumulated failures of the memory device to correctly read a data value of "1" using the various reference resistances. The read one failures 613 show a low number of failures when closer to a smaller reference trim value, and a high number of failures when closer to a large reference trim value.

A trim feedback circuit implementing an automated reference trim search process using failure tails shown in FIG. 6B can set a failure threshold 616 to the failure tails corresponding to a low-level of failures for the read zero failures 614 and read one failures 613. In some embodiments, the read zero failures 614 can be a difference between the accumulated read zero failures 604 at the different reference resistances 602 shown in FIG. 6A and the accumulated read zero failures 604 at the maximum trim value 607 shown in FIG. 6A. The read one failures 613 can be a difference between the accumulated read one failures 603 604 at the different reference resistances 602 shown in FIG. 6A and the accumulated read one failures 603 at the minimum trim value 606 shown in FIG. 6A. In some embodiments, the trim feedback circuit can determine fail bit count while reading data values of "0" from a memory device using a maximum reference trim, for example, providing a small number of bit failures, and set the failure threshold 616 for data values of "0" to the fail bit count. The trim feedback circuit also can determine fail bit count while reading data values of "1" from the memory device using a minimum reference trim, for example, providing a small number of bit failures, and set the failure threshold 616 for data values of "1" to the fail bit count. The trim feedback circuit can perform the automated search for a final trim value 615 using the failure thresholds 616.

Referring to FIG. 6C, the graph 620 has an x-axis corresponding to reference resistances 622 used by magnetoresistive memory device during read operations and has a y-axis corresponding to accumulated failures 621 of read operations using the various reference resistances 622. The reference resistances 622 can correspond to an initial reference resistance combined with various reference trim values.

In this example, the graph 620 shows read zero failures 624 and read one failures 613. The read zero failures 624 can correspond to a number of accumulated failures of the memory device to correctly read a data value of "0" using the various reference resistances. The read zero failures 624 show a high number of failures when closer to a smaller reference trim value, and a low number of failures when closer to a large reference trim value. The read one failures 623 can correspond to a number of accumulated failures of the memory device to correctly read a data value of "1" using the various reference resistances. The read one failures 623 show a low number of failures when closer to a smaller reference trim value, and a high number of failures when closer to a large reference trim value.

A trim feedback circuit can implement an automated reference trim search process using failure cliffs shown in FIG. 6C. The trim feedback circuit can perform the automated search to identify boundary values of the reference trim, for example, where the read one failure count and the read zero failure count exceed a failure threshold 626. The failure threshold 626 can correspond to a level of failures capable of being repaired, for example, using redundant row-based repair and/or redundant column-based repair, or corrected, for example, using a read data correction with an error correction control (ECC) process. In some embodiments, the failure threshold 626 can be set by the trim feedback circuit, for example, in response to user input. The trim feedback circuit can utilize the boundary trim values to select a final trim value 625 for the magnetoresistive memory device. The final trim value 625 can be different than the final trim value 615 shown in FIG. 6B. The final trim value 615 in FIG. 6B can correspond to common low point of the read zero failures 614 and the read one failures 613, while the final trim value 625 can have larger margins 627 from the intersections of the failure threshold 626 with the read zero failures 624 and the read one failures 623.

Referring back to FIG. 5, the trim feedback circuit 500 can include a trim mask 530 to receive the trim failure result 521 from the comparator 520 and generate a trim bit value 531 based on the trim failure result 521. In some embodiments, the trim bit value 531 can correspond to a bit of a final reference trim value for either reading data with a value of "0" or data with a value of "1". For example, when performing a binary search for the reference trim value, the trim mask 530 can set the trim bit value 531 to a zero for a particular bit location in the reference trim when the trim failure result 521 corresponds to a failure or set the trim bit value 531 to a one for the particular bit location in the reference trim when the trim failure result 521 corresponds to a pass.

Figure 7:
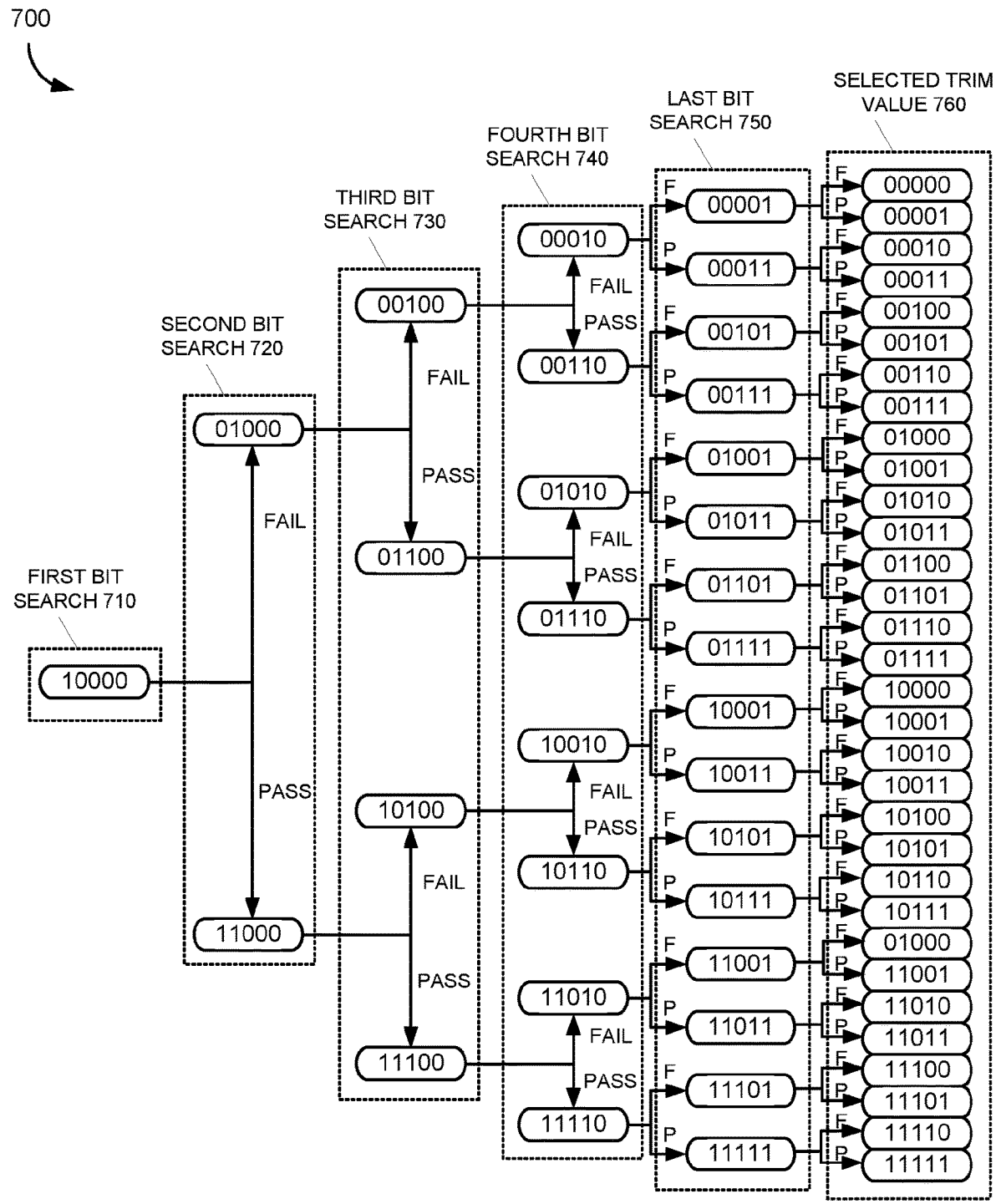
FIG. 7 illustrates a flowchart showing an example implementation of a binary search of the reference trim for one type of stored data in an automated reference trim search process according to various embodiments of the disclosed technology.

FIG. 7 illustrates a flowchart showing an example implementation of a binary search 700 of the reference trim for one type of stored data in an automated reference trim search process according to various embodiments of the disclosed technology. The binary search 700 can start with a first bit search 710 of the automated reference trim search process that sets a value of the reference trim to "10000". The first bit search 710 of the automated reference trim search process can determine whether a number of read failures using the reference trim "10000" corresponds to a pass or a fail relative to a failure threshold value.

In this example, when the first bit search 710 corresponds to a fail, a second bit search 720 sets a most significant bit of a next reference trim value to "0," sets the second most significant bit to "1", and sets the remaining bits to "0". When the first bit search 710 corresponds to a pass, the second bit search 720 sets a most significant bit of a next reference trim value to "1," sets the second most significant bit to "1", and sets the remaining bits to "0". The second bit search 720 of the automated reference trim search process can determine whether a number of read failures corresponds to a pass or a fail relative to the failure threshold value.

For a third bit search 730 of the automated reference trim search process, the reference trim can have the same value for the most significant bit as the second bit search 720. The automated reference trim search process can set the second most significant bit based on a pass or a failure during the second bit search 720, set the third most significant bit to "1", and set the remaining two bit to "0". The third bit search 730 of the automated reference trim search process can determine whether a number of read failures corresponds to a pass or a fail relative to the failure threshold value. Similar operations can be performed for the fourth bit search 740 and the last bit search 750, which can ultimately select a value for the reference trim as the selected trim value. The automated reference trim search process can iteratively perform multiple bit searches in order to identify the reference trim value for use by the memory device during read operations.

Referring back to FIG. 5, the trim feedback circuit 500 can include a selection circuit 540 to store the trim bit value 531 to the read zero boundary register 550 or the read one boundary register 560 based on the data type 503 being read from the memory device during the automated reference trim search process. For example, when the stored data in the memory device have a value of "0", the data type 503 can correspond to a zero data value, which can prompt the selection circuit 540 to store the trim bit value 531 from the trim mask 530 to the read zero boundary register 550. When the stored data in the memory device have a value of "1", the data type 503 can correspond to a one data value, which can prompt the selection circuit 540 to store the trim bit value 531 from the trim mask 530 to the read one boundary register 560.

The automated reference trim search process can iterate with a new reference trim value being provided to the memory device and the trim feedback circuit 500 setting additional values of the read zero boundary register 550 or the read one boundary register 560, until reference trim boundary values for reading data with a value of "0" and data with a value of "1" have been determined in the automated reference trim search process and stored in the read zero boundary register 550 and the read one boundary register 560, respectively.

The trim feedback circuit 500 can include a trim aggregator 570, which can merge the boundary values of the reference trim from the read zero boundary register 550 and the read one boundary register 560 into an aggregate reference trim value. In some embodiments, the trim aggregator 570 can average, weighted average, combine, select between, aggregate, or the like, the boundary values of the reference trim from the read zero boundary register 550 and the read one boundary register 560.

The trim feedback circuit 500 can include a selection circuit 580 to receive the aggregate reference trim value from the trim aggregator 570 and the trim bit value 531 from the trim mask 530. The selection circuit 580 can select between the aggregate reference trim value or the trim bit value 531 in response to a final trim signal 504, and output the selected value as a reference trim value 505. The trim feedback circuit 500 can include a trim register 590 to store the reference trim value 505 from the selection circuit 580, and provide the reference trim value 505 to the memory device for use during read operations.

Figure 8:
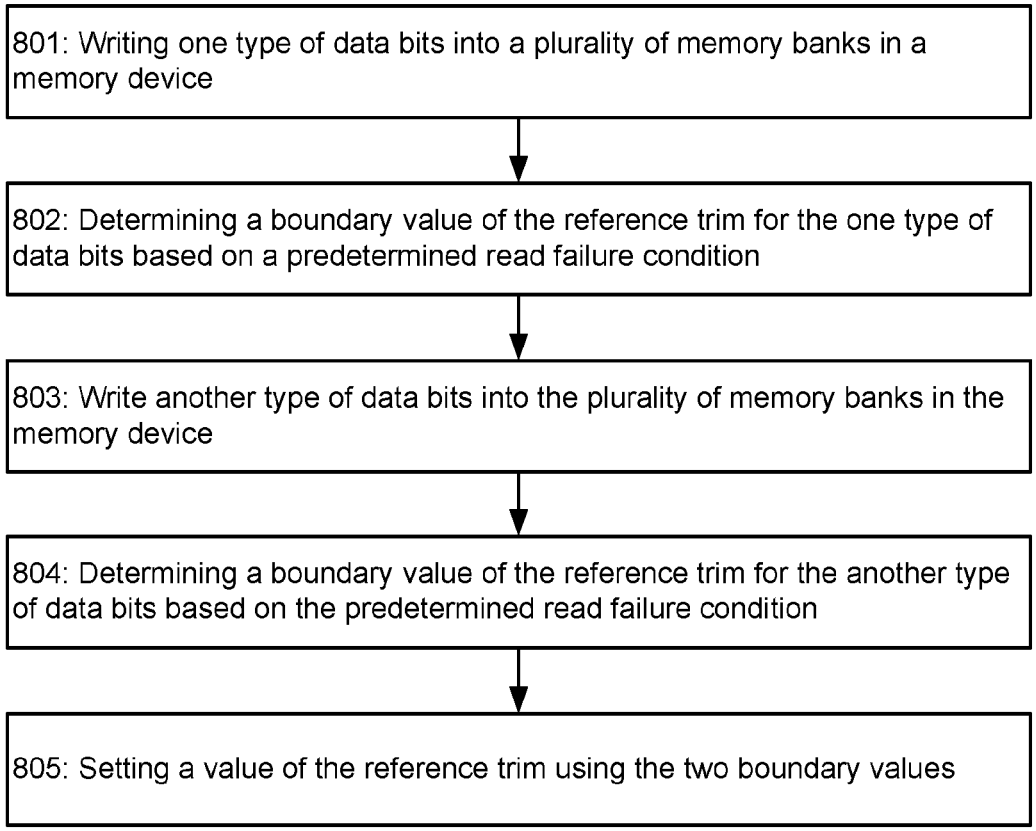
FIG. 8 illustrates a flowchart showing an example automated reference trim search process with address skipping according to various embodiments of the disclosed technology.

A memory device often has multiple memory banks. Typically, each memory read operation can access one of the memory banks. To set the reference trim accurately, all memory banks should be analyzed. However, applying a full reference trim search process on each of the memory banks can be time-consuming. FIG. 8 illustrates a flowchart 800 showing an example automated reference trim search process with address skipping according to various embodiments of the disclosed technology. In operation 801, a memory built-in self-test system writes one type of data bits into a memory device. The memory device comprises a plurality of memory banks. The one type of data can be either the "0" data type or the "1" data type. The memory built-in self-test system can generate a control signal to prompt the memory device to perform the write operations. In some embodiments of the disclosed technology, the memory built-in self-test system can write a data bit belong to the one type of data into each memory cell in each of plurality of memory banks.

In operation 802, the memory built-in self-test system determines a boundary value of a reference trim for the one type of data bits based on a predetermined failure condition. The memory built-in self-test system employs an address-skipping reference trim search approach for the determination. Embodiments of the address-skipping reference trim search approach will be described below in detail with reference to FIG. 9.

In operation 803, the memory built-in self-test system writes another type of data bits into the plurality of memory banks in the memory device. If the one type of data is the "0" data type, the another type of data bits will be the "1" data type, or vice versa.

In operation 804, the memory built-in self-test system determines a boundary value of the reference trim for the another type of data bits based on the predetermined failure condition. The memory built-in self-test system can employ the same address-skipping reference trim search approach for the determination. As mentioned above, embodiments of the address-skipping reference trim search approach will be described below in detail with reference to FIG. 9.

In operation 805, the memory built-in self-test system sets a value of the reference trim using the two boundary values of the reference trim. The memory built-in self-test system can average, weighted average, combine, select between, aggregate, or the like, the boundary values of the reference trim to derive the value of the reference trim.

Figure 9:
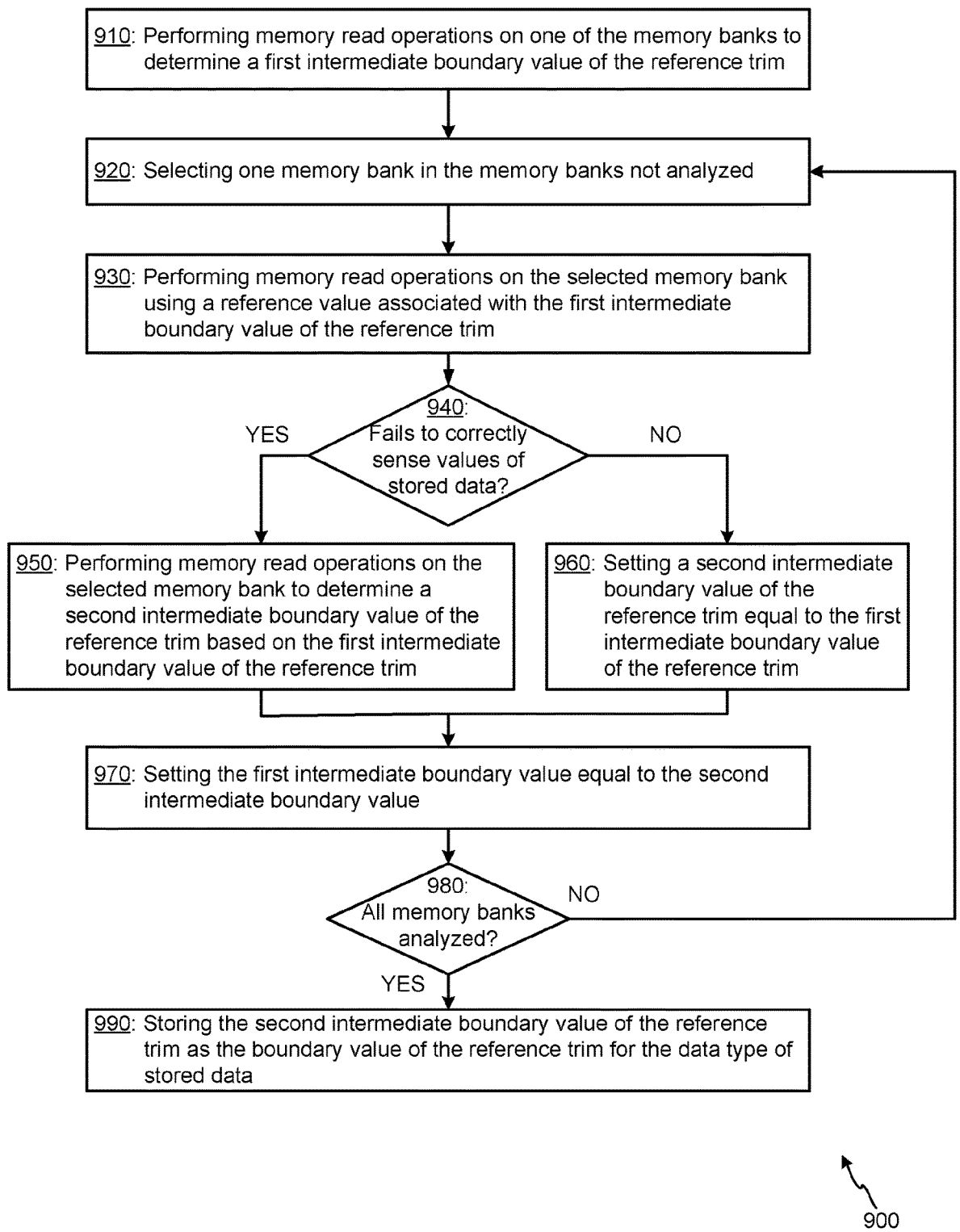
FIG. 9 illustrates a flowchart showing an example address-skipping reference trim search process for determining a boundary value of a reference trim according to various embodiments of the disclosed technology.

FIG. 9 illustrates a flowchart 900 showing an example address-skipping reference trim search process for determining a boundary value of a reference trim according to various embodiments of the disclosed technology. In block 910, a memory built-in self-test system performs memory read operations on one of memory banks in a memory device to determine a first intermediate boundary value of the reference trim. The memory built-in self-test system can generate a control signal to prompt the one of memory banks to perform the read operations. The memory built-in self-test system can employ, for example, the binary search sequence described above with reference to FIG. 7 to search for the first intermediate boundary value for the reference trim. For each step of the binary search sequence, the memory built-in self-test system uses a reference value associated with a selected value for the reference trim to sense data stored in the one of the memory banks. The memory built-in self-test system can then identify failures of the memory bank to correctly read the stored data by comparing the data read against the common data type of the stored data. Based on the identified failures and a predetermined failure condition, the memory built-in self-test system can determine whether the memory bank fails to correctly sense values of stored data based on the selected value for the reference trim.

The predetermined failure condition may be a threshold count of read failures, for example. The memory built-in self-test system can accumulate the failures of the memory bank to correctly read the stored data as a failure count, and compare the failure count to the threshold count of read failures. If the measured count is greater than or equal to the threshold count of read failures, the memory built-in self-test system can determine that the memory bank fails to correctly sense values of stored data based on the selected value for the reference trim. Otherwise, the memory built-in self-test system can determine that the memory bank does not fail to correctly sense values of stored data based on the selected value for the reference trim. It should be appreciated by a person of ordinary skill in the art that the predetermined failure condition can use a form different from the threshold count of read failures. It should also be appreciated by a person of ordinary skill in the art that the memory built-in self-test system can employ a search sequence other than the binary search sequence to search for the first intermediate boundary value of the reference trim.

In block 920, the memory built-in self-test system selects, for analysis, one memory bank in the memory banks that have not been analyzed. For example, the memory built-in self-test system can simply increase the bank address by one for the selection.

In block 930, the memory built-in self-test system performs memory read operations on the selected memory bank using a reference value associated with the first intermediate boundary value of the reference trim. The memory built-in self-test system can provide the selected memory bank with the first intermediate boundary value of the reference trim and prompt the selected memory bank to read the stored data. The memory built-in self-test system can generate a control signal for the prompting. In response to the control signal, the selected memory bank can sense the stored data and compare the sensed data against the reference value associated with the first intermediate boundary value of the reference trim to determine values for the stored data.

The memory built-in self-test system can identify failures of the selected memory bank to correctly read the stored data based on the first intermediate boundary value of the reference trim. The memory built-in self-test system can compare the data read from the selected memory bank against the data type of the stored data to identify the failures. The memory built-in self-test system can accumulate the failures and store them as a failure count for the data type for the selected memory bank.

In block 940, the memory built-in self-test system determines whether the selected memory bank fails to correctly sense values of stored data using the reference value associated with the first intermediate boundary value of the reference trim based on the predetermined failure condition and the failures determined in the block 930. As in block 910, the predetermined failure condition may be the threshold count of read failures. The memory built-in self-test system can compare the failure count for the selected memory bank to the threshold count of read failures. If the failure count for the selected memory bank is greater than or equal to the threshold count of read failures, the memory built-in self-test system can determine that the selected memory bank fails to correctly sense values of stored data using the reference value associated with the first intermediate boundary value of the reference trim, and the address-skipping reference trim search process can proceed to block 950. Otherwise, the memory built-in self-test system can determine that the selected memory bank does not fail to correctly sense values of stored data using the reference value associated with the first intermediate boundary value of the reference trim, and the address-skipping reference trim search process can proceed to block 960.

In the block 950, the memory built-in self-test system performs memory read operations on the selected memory bank to determine a second intermediate boundary value of the reference trim based on the first intermediate boundary value of the reference trim. The memory built-in self-test system can employ an approach similar to the one used for determining the first intermediate boundary value of the reference trim in the block 910. To speed up the determining process, the memory built-in self-test system can limit, for example, the search range to a range between the first intermediate boundary value of the reference trim and one of a lowest value or a highest value allowed for the reference trim based on data types of stored data. Assume that the reference trim can have a value between 00000 and 11111 and that like the graph 600 in FIG. 6A, read zero failures are mainly associated with low reference trim values and read one failures are mainly associated with high reference trim values. When the boundary value of the reference trim for the "0" data type of stored data is being determined first, the memory built-in self-test system can search for the second intermediate boundary value of the reference trim between the first intermediate boundary value of the reference trim and 11111. Then, when the boundary value of the reference trim for the "1" data type of stored data is being determined, the memory built-in self-test system can search for the second intermediate boundary value of the reference trim between the boundary value of the reference trim for the "0" data type of stored data already derived and the first intermediate boundary value of the reference trim for the "1" data type of stored data. In some embodiments, the memory built-in self-test system can employed a modified binary search sequence with bit skipping which will be described below in detail with reference to FIG. 10.

In the block 960, the memory built-in self-test system sets the second intermediate boundary value of the reference trim equal to the first intermediate boundary value of the reference trim. This avoids spending time in searching. The address for the selected memory bank can be considered to be skipped.

Upon the second intermediate boundary value of the reference trim being derived by either the block 950 or the block 960, in block 970, the memory built-in self-test system sets the first intermediate boundary value of the reference trim equal to the second intermediate boundary value of the reference trim.

In operation 980, the memory built-in self-test system determines whether all of the memory banks have been analyzed. If the answer is yes, the address-skipping reference trim search process can proceed to block 990; otherwise the address-skipping reference trim search process can proceed to block 920 to analyze another memory bank. The memory built-in self-test system can use a counter to keep track of the number of memory banks that have been analyzed.

In the block 990, the memory built-in self-test system stores the second intermediate boundary value of the reference trim as the boundary value of the reference trim for the data type of stored data.

According to some other embodiments of the disclosed technology, the address-skipping reference trim search process for determining a boundary value of a reference trim illustrated in flowchart 900 can be slightly modified. Rather than determining a single boundary value of the reference trim for the data type of stored data for all of the memory banks, the memory built-in self-test system can determine multiple ones whenever a first intermediate boundary value fails to correctly sense values of stored data for the next selected bank determined in the operation 940. The currently "failed" first intermediate boundary value can be stored as the boundary value of the reference trim for the data type of stored data for those previously-checked memory banks. As such, multiple boundary values of the reference trim for the data type of stored data can be determined for multiple groups of memory banks in the memory banks, respectively.

Figure 10:
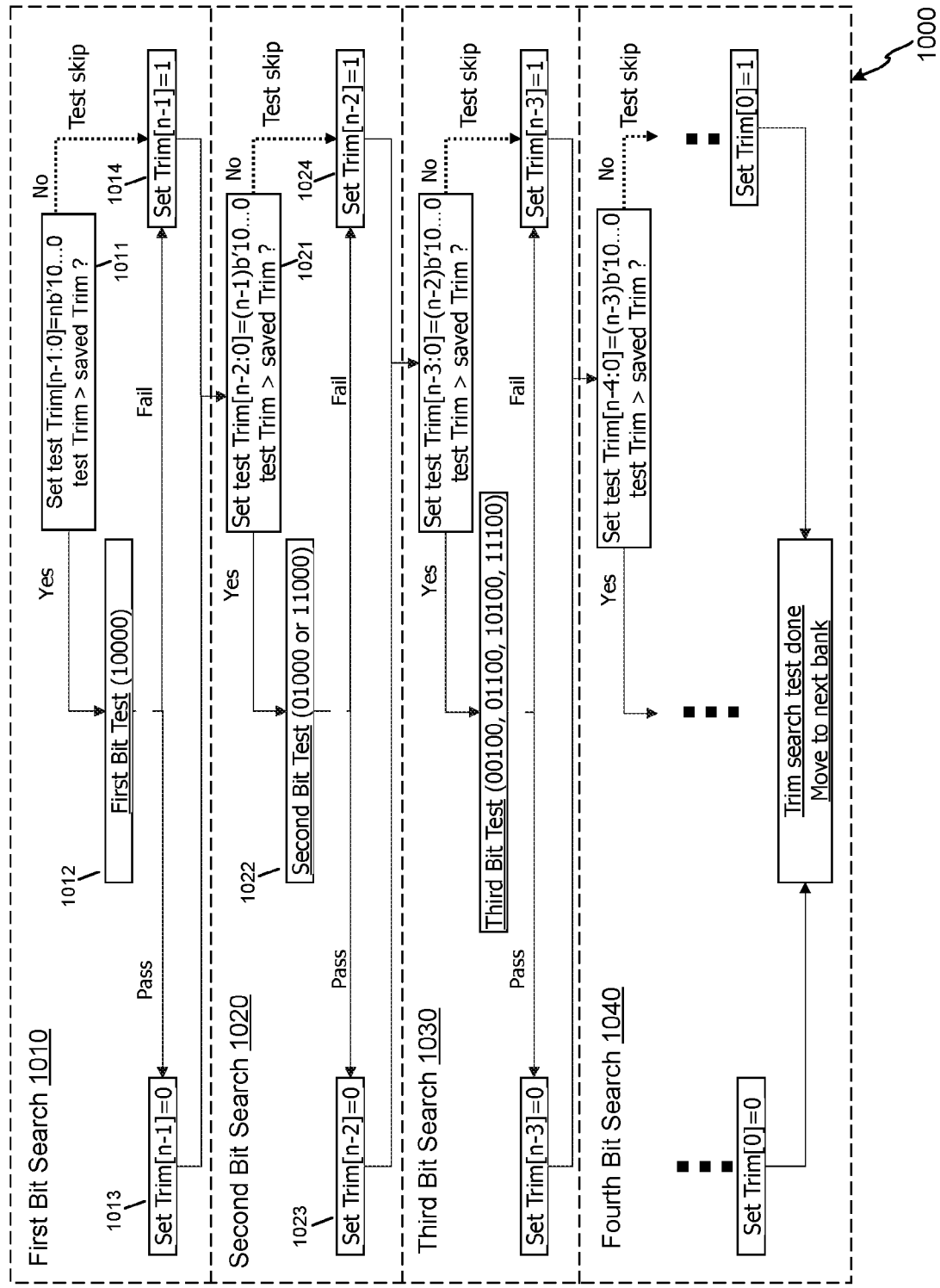
FIG. 10 illustrates a flowchart showing an example implementation of a modified binary search of a reference trim for one type of data stored in a memory bank based on a saved value of the reference trim according to various embodiments of the disclosed technology.

FIG. 10 illustrates a flowchart showing an example implementation of a modified binary search 1000 of a reference trim for one type of data stored in a memory bank based on a saved value of the reference trim according to various embodiments of the disclosed technology. The modified binary search 1000 sets the value of the reference trim bit by bit. A first bit search 1010 comprises three steps. In step 1011, a memory built-in self-test system can set the first bit of a test reference trim to be "1" and the rest of the bits of the test reference trim to be "0s" (for example, the test reference trim value being "10000" for the case of 5-bit trim setting) and then determine whether the test reference trim value is smaller than the saved value of the reference trim. If the test reference trim value is larger, the first bit search 1010 proceeds to step 1012. In the step 1012, the memory built-in self-test system can perform memory read operations on the memory bank based on the test reference trim and determine whether a number of read failures corresponds to a pass or a fail relative to a failure threshold value. If the number of read failures corresponds to a pass, the memory built-in self-test system can set Trim(n−1)=0 in step 1013; otherwise, the memory built-in self-test system can set Trim(n−1)=1 in step 1014. If the test reference trim value is determined to be smaller than the saved value of the reference trim in the step 1011, the memory built-in self-test system can skip the memory reading operations in step 1012 and directly go to the step 1014, setting Trim(n−1)=1.

A second bit search 1020 comprises three similar steps. In step 1021, the memory built-in self-test system can use the first bit determined previously from either the step 1013 or the step 1014 as the first bit of the test reference trim and set the second bit of the test reference trim to be "1" and the rest of the bits of the test reference trim to be "0s" (for example, the test reference trim value being either "01000" from the step 1013 or "11000" from the step 1014 for the case of 5-bit trim setting). Then the memory built-in self-test system can determine whether the test reference trim value is smaller than the saved value of the reference trim. If the test reference trim value is larger, the second bit search 1020 proceeds to step 1022. In the step 1022, the memory built-in self-test system can perform memory reading operations on the memory bank based on the test reference trim and determine whether a number of read failures corresponds to a pass or a fail relative to the failure threshold value. If the number of read failures corresponds to a pass, the memory built-in self-test system can set Trim(n−2)=0 in step 1023; otherwise, the memory built-in self-test system can set Trim(n−2)=1 in step 1024. If the test reference trim value is determined to be smaller than the saved value of the reference trim in the step 1021, the memory built-in self-test system can skip the memory reading operations in step 1022 and directly go to the step 1024, setting Trim(n−1)=1. Similar operations can be performed for a third bit search 1030, a fourth bit search 1040, and so on, until all of the bits of the reference trim value have been set. A person of ordinary skill in the art would appreciate that the modified binary search 1000 can be adapted for determining a boundary value of a reference trim for the other type of stored data.

Figure 11:
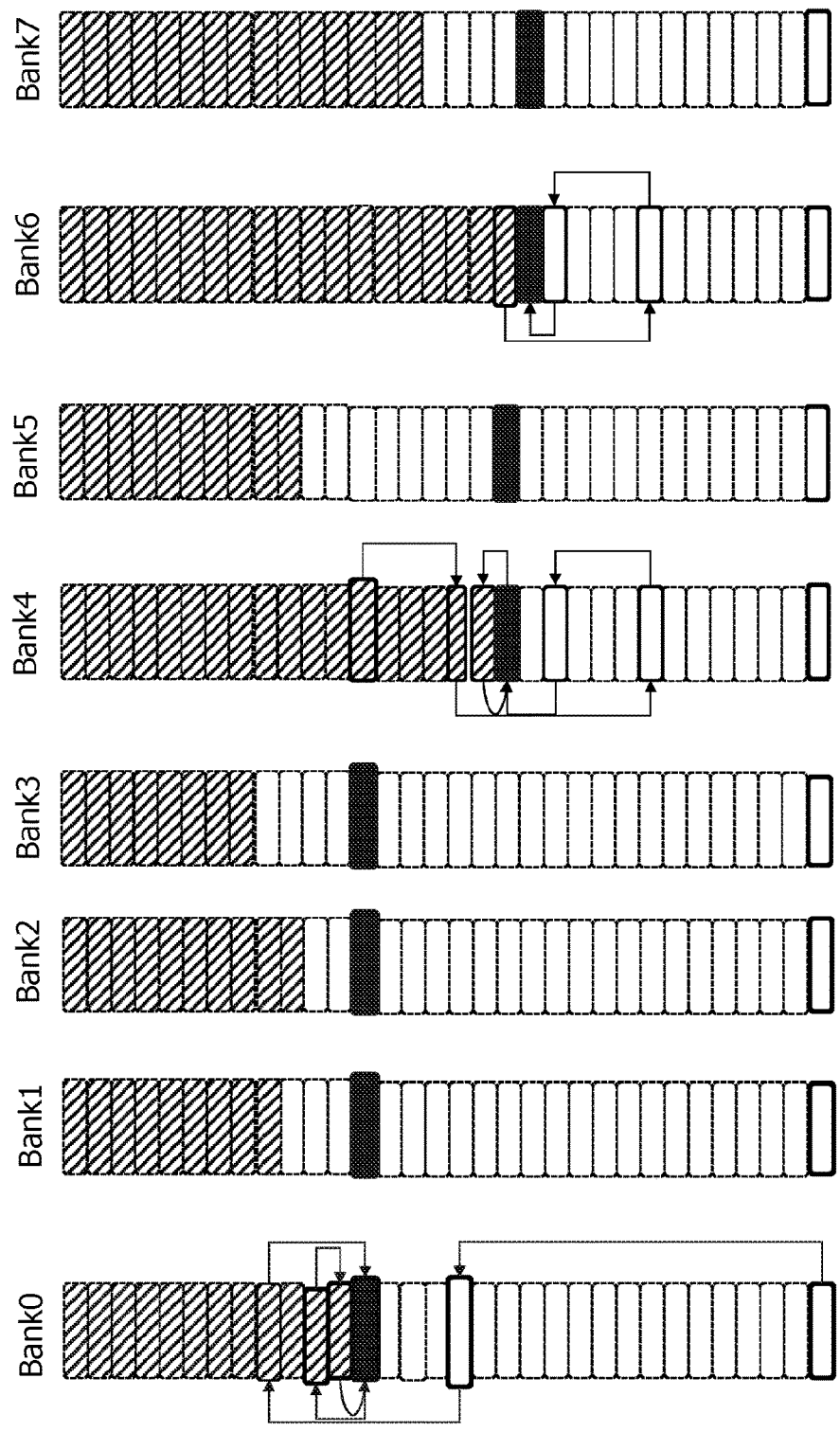
FIG. 11 illustrates an example of determining, for a memory device, a boundary value of a reference trim for the data type "0" according to various embodiments of the disclosed technology.

FIG. 11 illustrates an example of determining, for a memory device, a boundary value of a reference trim for the data type "0" according to various embodiments of the disclosed technology. The memory device has eight memory banks, Bank0-Bank7. In FIG. 11, line-shaded boxes under the name for each of the memory banks represent reference trim values corresponding to read 0 failures; boxes shaded with solid black color represent intermediate boundary values of the reference trim; and line arrows represent the search sequence. The search sequence for Bank0 is a binary search sequence like the one shown in FIG. 7. It starts with a reference trim value of 10000, which corresponds to a pass. In a next step, a reference trim value of 01000 is tested, leading to a fail. In a third step, a reference trim value of 01100 is tested, leading to a pass. After three more steps, 01100 (pass)-01010 (fail)-01011 (fail), the intermediate boundary value of the reference trim for Bank0 is determined to be 01100. This intermediate boundary value of the reference trim (01100) is tested for Bank1, Bank 2 and Bank3, of which none fails. Thus, no binary search is conducted for these three memory banks.

However, Bank4 fails when the intermediate boundary value of the reference trim (01100) is tested. A modified binary search sequence like the one shown in FIG. 7 is conducted to search for an updated intermediate boundary value of the reference trim. Because 01100<10000 and 10000 also leads to a fail of Bank4, the modified binary search sequence is the same as the original binary search sequence: 10000 (fail)-11000 (pass)-10100 (pass)-10010 (pass)-10001 (fail), resulting in the updated intermediate boundary value of 10010.

The updated intermediate boundary value of 10010 is tested for Bank5 and Bank6. Bank5 passes, so no binary search is conducted. Bank6 fails, so a modified binary search sequence like the one shown in FIG. 7 is conducted: 11000 (pass)-10100 (pass)-10011 (pass). The modified binary search sequence skips testing 10000 and 10010 because both are smaller than or equal to 10010. Bank7 passes the test of 10011, which leads to a final boundary value of the reference trim being 10011 for the data type "0".

Figure 12:
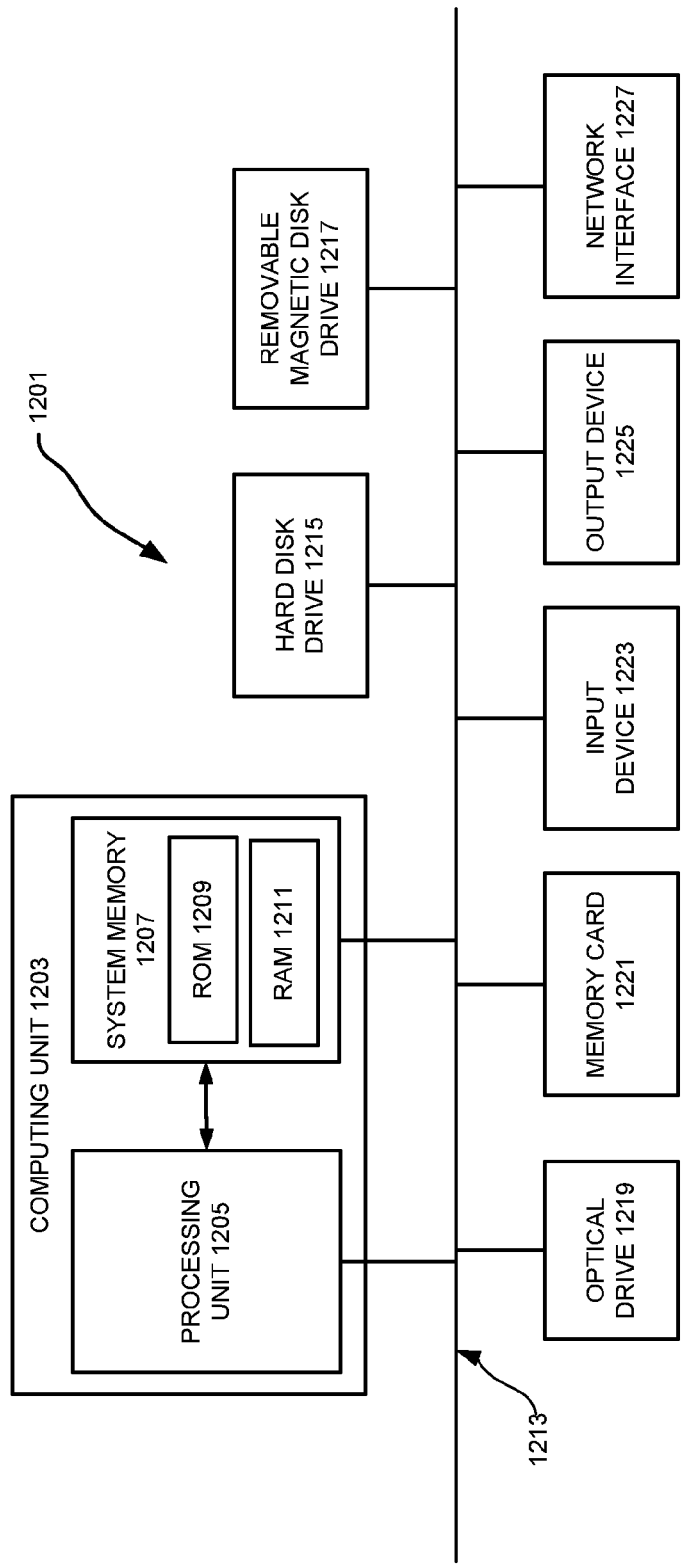
FIG. 12 illustrates an example of a programmable computer system with which various embodiments of the disclosed technology may be employed.

Various examples of the disclosed technology may be implemented through the execution of software instructions by a computing device, such as a programmable computer. For example, computer-executable instructions can cause a computer to perform a method comprising creating the memory built-in self-test system shown in FIG. 4 in a circuit design. Accordingly, FIG. 12 shows an illustrative example of a computing device 1201. As seen in this figure, the computing device 1201 includes a computing unit 1203 with a processing unit 1205 and a system memory 1207. The processing unit 1205 may be any type of programmable electronic device for executing software instructions, but it will conventionally be a microprocessor. The system memory 1207 may include both a read-only memory (ROM) 1209 and a random access memory (RAM) 1211. As will be appreciated by those of ordinary skill in the art, both the read-only memory (ROM) 1209 and the random access memory (RAM) 1211 may store software instructions for execution by the processing unit 1205.

The processing unit 1205 and the system memory 1207 are connected, either directly or indirectly, through a bus 1213 or alternate communication structure, to one or more peripheral devices. For example, the processing unit 1205 or the system memory 1207 may be directly or indirectly connected to one or more additional memory storage devices, such as a "hard" magnetic disk drive 1215, a removable magnetic disk drive 1217, an optical disk drive 1219, or a flash memory card 1221. The processing unit 1205 and the system memory 1207 also may be directly or indirectly connected to one or more input devices 1223 and one or more output devices 1225. The input devices 1223 may include, for example, a keyboard, a pointing device (such as a mouse, touchpad, stylus, trackball, or joystick), a scanner, a camera, and a microphone. The output devices 1225 may include, for example, a monitor display, a printer and speakers. With various examples of the computer 1201, one or more of the peripheral devices 1215-1225 may be internally housed with the computing unit 1203. Alternately, one or more of the peripheral devices 1215-1225 may be external to the housing for the computing unit 1203 and connected to the bus 1213 through, for example, a Universal Serial Bus (USB) connection.

With some implementations, the computing unit 1203 may be directly or indirectly connected to one or more network interfaces 1227 for communicating with other devices making up a network. The network interface 1227 translates data and control signals from the computing unit 1203 into network messages according to one or more communication protocols, such as the transmission control protocol (TCP) and the Internet protocol (IP). Also, the interface 1227 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 1201 is illustrated as an example only, and it is not intended to be limiting. Various embodiments of the disclosed technology may be implemented using one or more computing devices that include the components of the computer 1201 illustrated in FIG. 12, which include only a subset of the components illustrated in FIG. 12, or which include an alternate combination of components, including components that are not shown in FIG. 12. For example, various embodiments of the disclosed technology may be implemented using a multi-processor computer, a plurality of single and/or multiprocessor computers arranged into a network, or some combination of both.

Conclusion

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the disclosed technology. Rather, the scope of the disclosed technology is defined by the following claims and their equivalents. We therefore claim as our disclosed technology all that comes within the scope and spirit of these claims.

What is claimed is:

1. A circuit, comprising:
a memory device configured to sense values of stored data using a reference value associated with a reference trim during memory read operations, the memory device comprising a plurality of memory banks; and
a memory built-in self-test system configured to perform memory processes on the memory device, one of the memory processes being an automated reference trim search process comprising:
determining boundary values of the reference trim for data types of "0" and "1" separately based on a predetermined failure condition, and
setting the reference trim using the boundary values of the reference trim for data types of "0" and "1",
wherein determining each of the boundary values of the reference trim for data types of "0" and "1" comprises:
performing a first plurality of the memory read operations on one of the memory banks to determine whether the one of the memory banks fails to correctly sense values of stored data using a reference value associated with a first intermediate boundary value of the reference trim based on the predetermined failure condition, setting, if the one of the memory banks does not fail, a second intermediate boundary value of the reference trim equal to the first intermediate boundary value of the reference trim, performing, if the one of the memory banks fails, a second plurality of the memory read operations on the one of the memory banks to determine the second intermediate boundary value of the reference trim based on a search sequence, the first intermediate boundary value of the reference trim, and the predetermined failure condition, and repeating the above operations by setting the first intermediate boundary value of the reference trim equal to the second intermediate boundary value of the reference trim for another one of the memory banks.

2. The circuit recited in claim 1, wherein the memory built-in self-test system comprises:

a memory built-in self-test controller configured to prompt the memory device to perform the memory read operations and memory write operations during the automated reference trim search process, and a built-in self-test interface comprising:

a failure detection circuit configured to determine whether the memory device fails to correctly sense a value stored in the memory device, and a trim feedback circuit configured to adjust intermediate boundary values of the reference trim based on the determined failure result during the automated reference trim search process.

3. The circuit recited in claim 1, wherein the determining each of the boundary values of the reference trim for "0" and "1" further comprises:

performing a third plurality of the memory read operations on a memory bank in the memory banks to determine an initial value of the first intermediate boundary value of the reference trim based on a binary search sequence.

4. The circuit recited in claim 1, wherein the search sequence is a binary search sequence, each step of the binary search sequence determining one bit of the second intermediate boundary value of the reference trim.

5. The circuit recited in claim 4, wherein the binary search sequence skips testing some bits of the second intermediate boundary value of the reference trim based on the first intermediate boundary value of the reference trim.

6. The circuit recited in claim 1, wherein the determining the second intermediate boundary reference trim is performed in a range between the first intermediate boundary value of the reference trim and one of a lowest value or a highest value allowed for the reference trim based on data types of stored data.

7. The circuit recited in claim 1, wherein the predetermined failure condition is a threshold count of read failures.

8. The circuit recited in claim 1, wherein the sensing values of stored data using a reference value associated with a reference trim comprises:

comparing electrical values (resistance values, current values, or voltage values) associated with the memory cells being sensed to a reference value associated with the reference trim.

9. The circuit recited in claim 1, wherein the memory device is a magnetoresistive random-access memory (MRAM) or a resistive random access memory (ReRAM).

10. One or more computer-readable media storing computer-executable instructions for causing a computer to perform a method, the method comprising:

creating a memory built-in self-test system in a circuit design, the circuit design comprising a memory device configured to sense values of stored data using a reference value associated with a reference trim during memory read operations, the memory device comprising a plurality of memory banks, the memory built-in self-test system configured to perform memory processes on the memory device, one of the memory processes being an automated reference trim search process comprising:

determining boundary values of the reference trim for data types of "0" and "1" separately based on a predetermined failure condition, and setting the reference trim using the boundary values of the reference trim for data types of "0" and "1", wherein determining each of the boundary values of the reference trim for data types of "0" and "1" comprises:

performing a first plurality of the memory read operations on one of the memory banks to determine whether the one of the memory banks fails to correctly sense values of stored data using a reference value associated with a first intermediate boundary value of the reference trim based on the predetermined failure condition, setting, if the one of the memory banks does not fail, a second intermediate boundary value of the reference trim equal to the first intermediate boundary value of the reference trim, performing, if the one of the memory banks fails, a second plurality of the memory read operations on the one of the memory banks to determine the second intermediate boundary value of the reference trim based on a search sequence, the first intermediate boundary value of the reference trim, and the predetermined failure condition, and repeating the above operations by setting the first intermediate boundary value of the reference trim equal to the second intermediate boundary value of the reference trim for another one of the memory banks.

11. The one or more computer-readable media recited in claim 10, wherein the memory built-in self-test system comprises:

a memory built-in self-test controller configured to prompt the memory device to perform the memory read operations and memory write operations during the automated reference trim search process, and a built-in self-test interface comprising:

a failure detection circuit configured to determine whether the memory device fails to correctly sense a value stored in the memory device, and a trim feedback circuit configured to adjust intermediate boundary values of the reference trim based on the determined failure result during the automated reference trim search process.

12. The one or more computer-readable media recited in claim 10, wherein the determining each of the boundary values of the reference trim for "0" and "1" further comprises:

performing a third plurality of the memory read operations on a memory bank in the memory banks to determine an initial value of the first intermediate boundary value of the reference trim based on a binary search sequence.

13. The one or more computer-readable media recited in claim 10, wherein the search sequence is a binary search sequence, each step of the binary search sequence determining one bit of the second intermediate boundary value of the reference trim.

14. The one or more computer-readable media recited in claim 13, wherein the binary search sequence skips testing some bits of the second intermediate boundary value of the reference trim based on the first intermediate boundary value of the reference trim.

15. The one or more computer-readable media recited in claim 10, wherein the determining the second intermediate boundary reference trim is performed in a range between the first intermediate boundary value of the reference trim and one of a lowest value or a highest value allowed for the reference trim based on data types of stored data.

16. The one or more computer-readable media recited in claim 10, wherein the predetermined failure condition is a threshold count of read failures.

17. The one or more computer-readable media recited in claim 10, wherein the sensing values of stored data using a reference value associated with a reference trim comprises:
  comparing electrical values (resistance values, current values, or voltage values) associated with the memory cells being sensed to a reference value associated with the reference trim.

18. The one or more computer-readable media recited in claim 10, wherein the memory device is a magnetoresistive random-access memory (MRAM) or a resistive random access memory (ReRAM).

* * * * *